(12) United States Patent  
Ajito (10) Patent No.: US 8,144,212 B2  
(45) Date of Patent: Mar. 27, 2012

(54) WHITE BALANCE ADJUSTMENT APPARATUS AND WHITE BALANCE COEFFICIENT CALCULATION METHOD

(75) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 411 days.

(21) Appl. No.: 12/512,348

(22) Filed: Jul. 30, 2009

(65) Prior Publication Data

US 2010/0033595 A1 Feb. 11, 2010

(30) Foreign Application Priority Data

Jul. 30, 2008 (JP) ................................. 2008-196246

(51) Int. Cl.
*H04N 9/73* (2006.01)
*G06K 9/00* (2006.01)

(52) U.S. Cl. ..................................... 348/223.1; 382/167

(58) Field of Classification Search ............... 348/222.1, 348/223.1, 225.1; 382/167
See application file for complete search history.

(56) References Cited

U.S. PATENT DOCUMENTS

| 6,160,579 A | 12/2000 | Shiraiwa et al. |
| 7,969,483 B2* | 6/2011 | Takasumi .................... 348/224.1 |
| 2002/0101516 A1* | 8/2002 | Ikeda ............................ 348/223 |
| 2007/0297693 A1* | 12/2007 | Lee ............................... 382/284 |

FOREIGN PATENT DOCUMENTS

JP 5-83729 4/1993

\* cited by examiner

*Primary Examiner* — Daniel M Pasiewicz
(74) *Attorney, Agent, or Firm* — Scully, Scott, Murphy & Presser, P.C.

(57) ABSTRACT

A white balance adjustment apparatus which is input image data acquired by an imager element to adjust a balance among color signals of the image data of a present frame includes an evaluation acquisition unit configured to acquire a plurality of groups of color signal data at each pixel position, as evaluation values, from the image data of the present frame and image data of at least one previous frame which is acquired before the present frame. The evaluation value acquisition unit includes an overlap area detection unit configured to detect image areas overlapping with each other between the image data of the at least one previous frame and the image data of the present frame. The evaluation values to be acquired from the image data of the at least one previous frame are selectively acquired in response to a detection result from the overlap area detection unit.

9 Claims, 7 Drawing Sheets

WHITE BALANCE ADJUSTMENT APPARATUS AND WHITE BALANCE COEFFICIENT CALCULATION METHOD

CROSS-REFERENCE TO RELATED APPLICATIONS

This application is based upon and claims the benefit of priority from the prior Japanese Patent Application No. 2008-196246, filed on Jul. 30, 2008, the entire contents of which are incorporated herein by reference.

BACKGROUND OF THE INVENTION

1. Field of the Invention

The present invention relates to a white balance adjustment apparatus for use in a digital camera, a video camera, etc., and relates to a white balance coefficient calculation method for use in white balance correction.

2. Description of the Related Art

Generally, a digital camera or a video camera is provided with an auto white balance adjustment apparatus for automatically correcting color balance so as to the color of a white color light source becomes achromatic. Thereby, a photograph with a color tone having no feeling of wrongness can be obtained by producing satisfactory results of chromatic adaptation in a human visual system on a finished photograph in a pseudo manner. To perform the white balance correction, it is firstly necessary to measure a white color itself. Conventionally, a method for measuring a white color by using an output from a photometrical sensor provided separately from an imager element of a camera, or a method for detecting a white color on the basis of image data from an imager element has been adopted. Since the method for measuring the white color by using the output from the photometrical sensor increases a cost and an image acquisition range and a photometrical range are not always agree with each other, errors are unavoidable. Therefore, generally, a method for detecting the color of the light source (achromatic color) on the basis of the image data from the imager element has been mainly adopted.

However, in such a method for detecting the color of the light source based on the image data, in the case where there is no or very few color of the light source (achromatic color) in the image data, the method suffers from the disadvantage that a precise white balance correction cannot be performed. As regards such a problem, a method for performing white balance control by using images of a plurality of frames including image data which has acquired previously is disclosed in U.S. Pat. No. 6,160,579 and Jpn. Pat. Appln. KOKAI Publication No. 5-83729. According to this method, even if no color of the light source exists in the image to be applied the white balance control, a detection probability of the light source color can be increased by using images of other frames.

BRIEF SUMMARY OF THE INVENTION

According to a first aspect of the present invention, there is provided a white balance adjustment apparatus which is input image data acquired by an imager element to adjust a balance among color signals of the image data of a present frame, comprising: an image data storage unit configured to store image data of at least one previous frame which is acquired before the present frame; an evaluation value acquisition unit configured to acquire a plurality of groups of color signal data at each pixel position, as evaluation values, from the image data of the present frame and from the image data of the at least one previous frame; a white balance coefficient calculation unit configured to calculate white balance coefficients on the basis of the plurality of groups of evaluation values acquired by the evaluation value acquisition unit; and a white balance correction unit configured to correct the image data of the present frame acquired by the imager element on the basis of the white balance coefficients calculated by the white balance coefficient calculation unit, wherein the evaluation value acquisition unit includes an overlap area detection unit configured to detect image areas overlapping with each other between the image data of the at least one previous frame and the image data of the present frame, and selectively acquires the evaluation values to be acquired from the image data of the at least one previous frame, in response to a detection result from the overlap area detection unit.

According to a second aspect of the present invention, there is provided a white balance coefficient calculation method for calculating white balance coefficients for adjusting a balance among color signals of image data of a present frame acquired from an imager element, comprising: acquiring a plurality of groups of color signal data at each pixel position, as evaluation values from image data of a present frame acquired by the imager element and from image data of at least one previous frame which is acquired before the present frame; and calculating the white balance coefficients on the basis of the acquired plurality of groups of evaluation values, wherein the acquiring the plurality of groups of evaluation values includes detecting image areas overlapping with each other between the image data of the at least one previous frame and the image data of the present frame, and selectively acquires the evaluation values to be acquired from the image data of the at least one previous frame, in response to a detection result of the image areas overlapping with each other.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A white balance adjustment apparatus regarding one embodiment of the invention receives image data acquired from an imager element of a camera with the white balance adjustment apparatus mounted thereon to adjust a balance among color signals of an image of a present frame.

Figure 1:
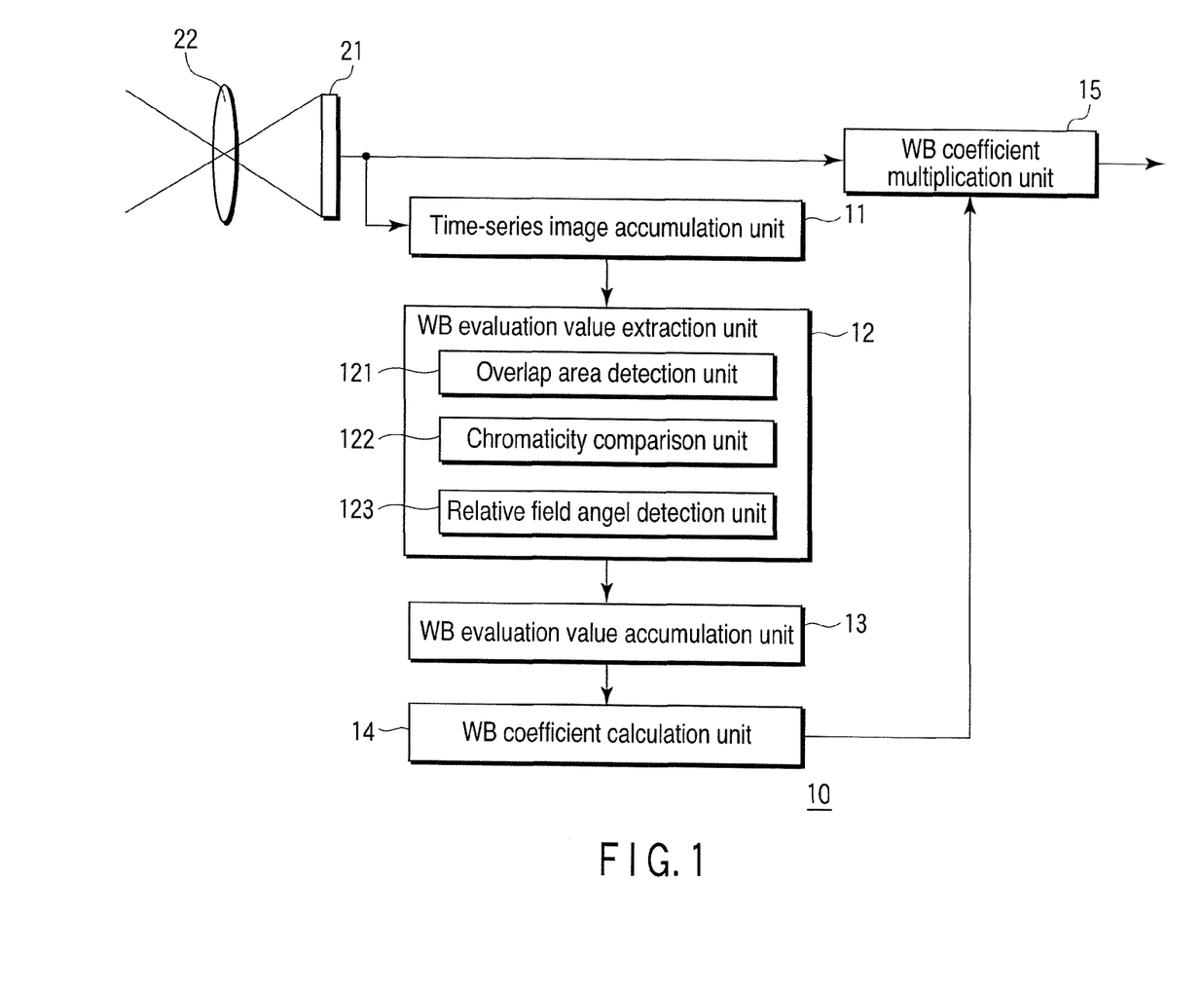
FIG. 1 is an exemplary view depicting an entire configuration of a white balance adjustment apparatus regarding an embodiment of the invention.

More specifically, as shown in FIG. 1, a white balance adjustment apparatus 10 is composed of a time-series image accumulation unit 11, a WB evaluation value extraction unit 12, a WB evaluation value accumulation unit 13, a WB coefficient calculation unit 14 and a WB coefficient multiplication unit 15. The time-series image accumulation unit 11 functions as an image data storage unit for storing image data of a plurality of frames including previous frames which have acquired within a predetermined time from present by an imager element 21 acquiring an image of an object through an image acquisition lens 22, namely for storing image data of the newest frame (present frame) and image data of at least one previous frame. The WB evaluation value extraction unit 12 determines a scene with the same illumination environment from the image data of the plurality of frames stored in the accumulation unit 11 to extract evaluation values for calculating a white balance coefficient from the image data with the same scene. The WB evaluation value accumulation unit 13 accumulates the evaluation values extracted by the extraction unit 12. The WB coefficient calculation unit 14 functions as a white balance coefficient calculation unit calculating the white balance coefficients on the basis of the evaluation values accumulated in the accumulation unit 13. The WB coefficient multiplication unit 15 functions as a white balance correction unit for correcting the image data of the present frame by multiplying the image of the present frame acquired with the imager element 21 by WB coefficients calculated by the WB coefficient calculation unit 14.

Here, the accumulation unit 11 stores image data of previous frames acquired within a predetermined time. However, it is not always needed to store the image data of all frames acquired within the predetermined time. For instance, it is enough to store image data only of frames thinned in a predetermined inverter period within the predetermined time. It is not always necessary to store all pixels for each item of frame image data. The accumulation unit 11 may store small image data reduced by a predetermined ratio. By thinning or reducing in this manner, the accumulation unit 11 may store the frame image data of further long period in a predetermined memory capacity having a memory consisting of the accumulation unit 11. Therefore, the calculation unit 14 can increase the detection probability of the light source color.

In detail, the WB evaluation value extraction unit 12 includes an overlap area detection unit 121, a chromaticity comparison unit 122, and a relative field angel detection unit 123. The overlap area detection unit 121 detects image areas overlapping with one another among each frame. The comparison unit 122 functions as an environment determination unit for comparing color signal data of image data among each frame in overlapped parts detected by the area detection unit 121 with one another to determine whether or not the image data of each frame is acquired in the same illumination environment. The field angle detection unit 123 calculates the degree of expansion or reduction distortion with which the field angle size of the image data of the frame determined as the same scene is acquired relative to the field angle size of the image data of the present (newest) frame.

Figure 2A:
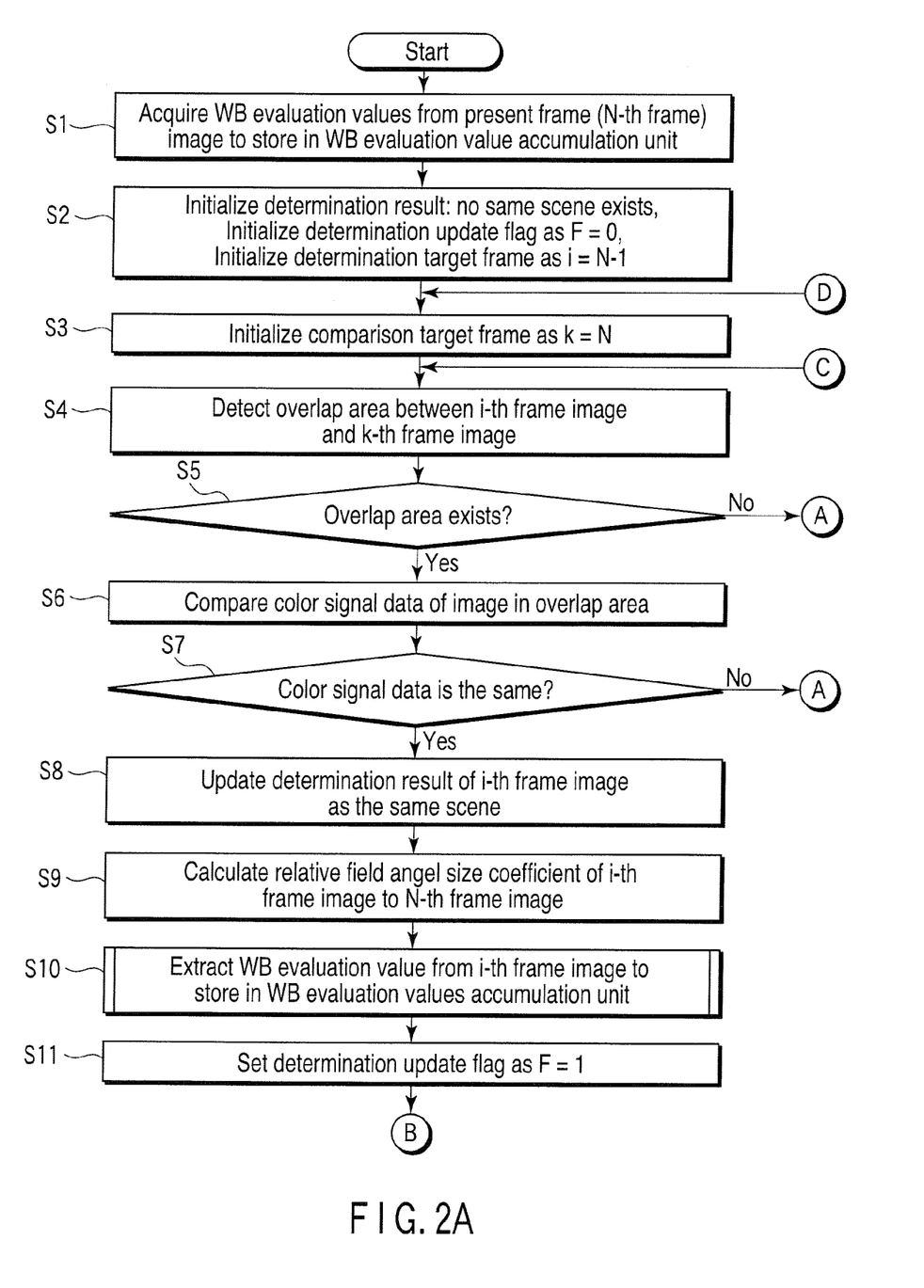
FIG. 2A is an exemplary view depicting a first part of a flowchart for explaining a process in white balance (WB) evaluation value extraction of a WB evaluation value extraction unit of FIG. 1.
Figure 2B:
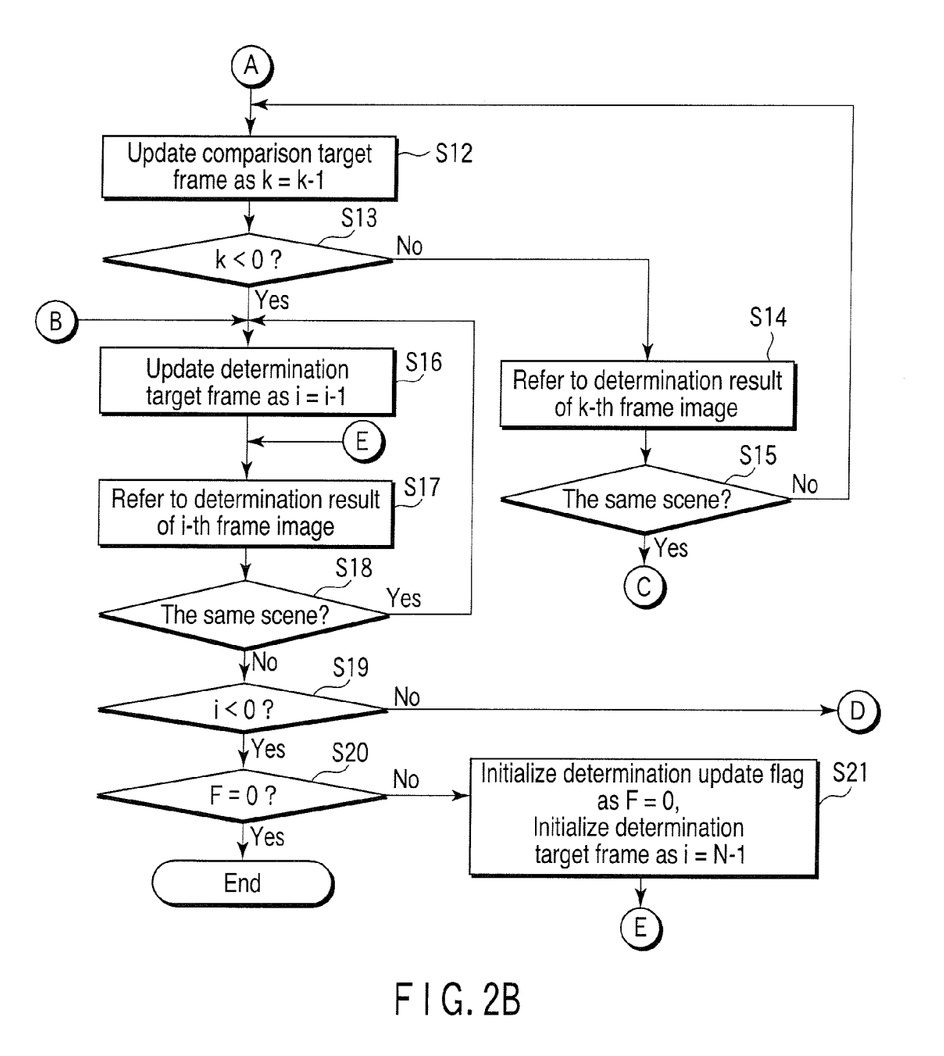
FIG. 2B is an exemplary view depicting a second part of a flowchart for explaining the process in the WB evaluation value extraction of the WB evaluation value extraction unit of FIG. 1.

Hereinafter, processes for determining the scenes of which the illumination environments are the same as one another to extract the evaluation values with reference to the flowcharts shown in FIGS. 2A and 2B.

Figure 3A:
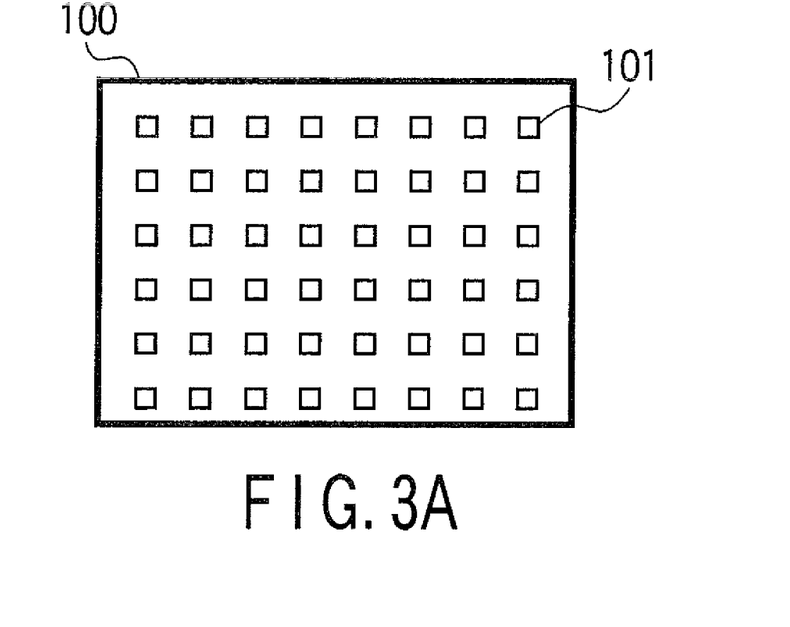
FIG. 3A is an exemplary view for explaining evaluation value extraction positions.
Figure 3B:
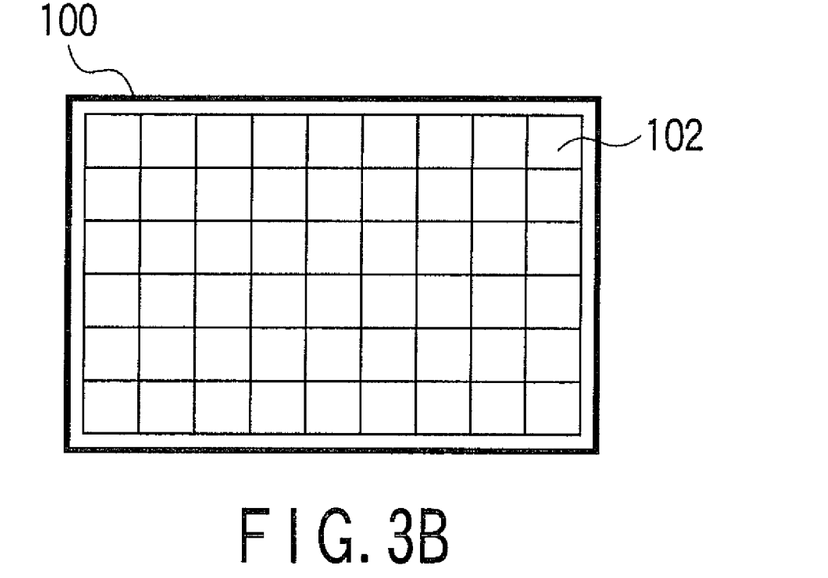
FIG. 3B is an exemplary view for explaining evaluation value extraction areas.

The WB evaluation value extraction unit 12 firstly acquires color signal data of each pixel position over the entire image areas from the image data of the present (newest) frame as the WB evaluation value to output the color signal data to the WB evaluation value accumulation unit 13 in the latter stage, and stored the color signal data in the accumulation unit 13 (Step S1). At this time, as shown in FIG. 3A, the extraction unit 12 use the pixel positions thinned at fixed intervals from the entire positions of a present image area 100 as the extraction positions 101 to may extract the color signal data of the extraction positions 101 as the evaluation values. The extraction unit 12 may, as shown in FIG. 3B, obtain an averaged value of the color signal data for each evaluation value extraction area 102 of a certain fixed size to extract the obtained averaged values as the evaluation values.

Next, according to Step S2 or later, the extraction unit 12 determines whether or not the frame image data in the previous time from the present time has the same scene as that of the present frame image data and extracts the evaluation values of the previous frame image data. Here, it is assumed that N pieces of frame image data are stored in the image accumulation unit 11. And it is assumed that the 0-th frame is the frame photographed at the oldest time, and the N-th frame is the present (newest) frame.

Firstly, the extraction unit 12 performs initial setting for determination (Step S2). That is, in this stage, the extraction unit 12 sets that the determination result is not the same scene for all previous frames (frames from the 0-th to the (N−1)-th) as initialization of the determination result. The extraction unit 12 sets a determination update flag F showing whether or not the determination result has been updated through determination processing in a latter stage, and further sets the first determination target frame i to be determined to the (N−1)-th frame.

Next, the extraction unit 12 sets to the image data of the N-th frame (present frame image) the image data of a frame (comparison target frame) k to be a reference in determination whether or not the same scene (Step S3).

After this, the extraction unit 12 detects an overlap area overlapping with each other between the image data of the determination target frame and the image data of the comparison target frame by using the overlap area detection unit 121 in FIG. 1 (Step S4). The extraction unit 12 determines whether or not the overlap area between the image data of the determination target frame and the image data of the comparison target frame (Step S5), if the overlap area exits, the extraction unit 12 proceeds to latter stage Step S6. Conversely, if the overlap area does not exist, the extraction unit 12 updates the comparison target frame to other frame already determined as the same scene in the processing of Steps S12-S15, and repeats Steps S4 and S5. That is, the extraction unit 12 updates the comparison target frame k to the frame which is previous by one frame (Step S12), and as a result, determines whether or not the comparison target frame has become the (−1)-th frame, namely, has completed the determination processing for the entire comparison target frames (Step S13). If the determination processing for the entire comparison target frames has not completed yet, the extraction unit 12 refers to the determination result of the image data of the updated comparison target frame (Step S14), to recognize whether or not the updated image data is the image data of the previous frame already determined as the same scene (Step S15). Here, if the updated image data is not the image data of the same scene, the extraction unit 12 returns to Step S12, and if the updated data is the image data of the same scene, returns to Step S14. In Step S13, if it is determined that the determination processing to the image data of all the comparison target frames has completed, the extraction unit 14 updates the comparison target frame i to the next frame to continue the determination processing in Step S16.

As regards a concrete method for detecting the overlap area by the area detection unit 121, the method may perform matching of patterns or a feature amount for each part area of the image data to detect areas corresponding to one another among frames. Although, not shown, the area detection unit 121 may detect to store the position and angle change of the adjustment apparatus by using a gyro sensor disposed outside the apparatus and thus may predict the change in field angle from the position and angle change among frames to calculate the overlap areas.

If it is determined that the overlap areas exist through Step S5, the extraction unit 12 uses the chromaticity comparison unit 122 of FIG. 1 to compare the color signal data in the overlapped areas between the image data of the determination target frame and the image data of the comparison target frame (Step S6). That is, if it is set that the color signal data in the image data of the determination target frame to $R_i(x, y)$, $G_i(x, y)$, $B_i(x, y)$, and the color signal data in the image data of the comparison target frame to $R_k(x, y)$, $G_k(x, y)$, $B_k(x, y)$, $\Delta RB$ expressed by the following Equation (1) is defined a chromaticity comparison value among frames:

$$\Delta_{RB} = \left( \sum_{(x,y)=\Omega} \frac{R_i(x, y)}{G_i(x, y)} - \sum_{(x,y)=\Omega} \frac{R_k(x, y)}{G_k(x, y)} \right)^2 + \left( \sum_{(x,y)=\Omega} \frac{B_i(x, y)}{G_i(x, y)} - \sum_{(x,y)=\Omega} \frac{B_k(x, y)}{G_k(x, y)} \right)^2 \quad (1)$$

where, $\Omega$ represents the overlap area, and $\Sigma$ represents that overlap area is accumulated for each pixel.

The comparison unit 122 determines whether or not the color signal data among frames are the same, namely, whether or not the illumination environment are the same among frames, by determining whether the chromaticity comparison value is within a predetermined value (Step S7). Here, if the chromaticity comparison value is within the predetermined value, it is determined that the illumination environment among frames are the same, it is determined that the determination target frame is the same scene as that of the present scene, and the determination result to the determination target frame is updated as the same scene (Step S8). Meanwhile, if the chromaticity comparison value is equal to or more than the foregoing certain predetermined value, it is determined that the illustration environment among frames has changed, the extraction unit 12 updates the comparison target frame by the processing in Steps S12-S15 in the same manner as those of mentioned above to repeat the processing in Steps S4 and S5 again.

In this way, the WB evaluation extraction unit 12 selects whether or not the evaluation values of the image data of the determination target frame should be used in response to the determination result by the chromaticity comparison unit 122.

In Step S8, after the update of the determination result, the extraction unit 12 calculates the field angle size coefficient that is a size rate of a relative field angel between the image data of the determination target frame and the image data of the present frame (Step S9). That is, by using the relative field angle detection unit 123 in FIG. 1, the extraction unit 12 calculates a rate of change of the field angle size from a change in size of a pattern (or feature amount) of area overlapping with each other between the image data of the determination target frame and the image data of the comparison target frame, and calculates the coefficient of the field angle size from the rate of change of the field angle size. Here, if the image data of the determination target frame is the present (N-th) frame, the rate of change of the field angle size between the image data of the determination target frame and the image data of the comparison target frame may be set as the coefficient of the field angle size as it is. Meanwhile, if the image data of the comparison target frame is determined to be the image data of the previous frame determined of the same scene, the extraction unit 12 multiplies the image size coefficient already obtained for the image data of the determination target frame by the rate of change in the field angle size coefficient between the image data of the determination target frame and the image data of the comparison target frame, and thus, can obtain the field angle size coefficient to the image data of the present (N-th) frame.

Next, the WB evaluation value extraction unit 12 extracts the WB evaluation values from the determination target frame that is determined as the same scene and outputs the WB evaluation values to the WB evaluation value accumulation unit 13 of FIG. 1 and stores the evaluation values in the accumulation unit 13 (Step S10).

Figure 4:
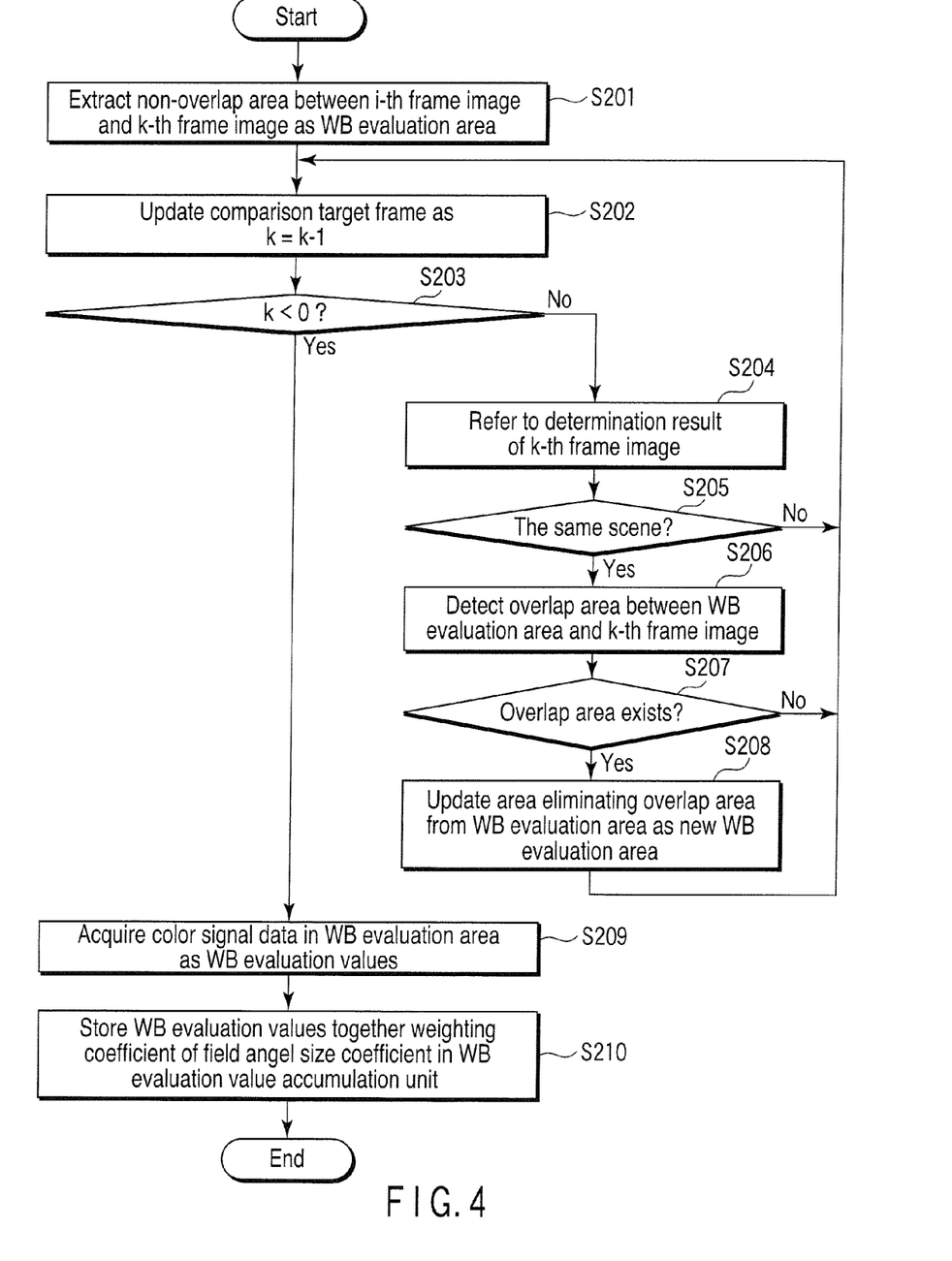
FIG. 4 is an exemplary view depicting a flowchart for explaining a flow of a concrete process in Step S10 of FIG. 2A.

The process of Extraction and storage of the WB evaluation values in Step S10 will be described with reference to FIG. 4. The extraction unit 12 extracts a non-overlap area that is an area not overlapping with the image data of the comparison target frame, for the image data of the determination target frame, as a WB evaluation area (Step S201). Further, from Step S202 to Step S208, the comparison target frame is updated, an area not overlapping with the image data of all the frames which have already determined as the same scene including the image data in the present frame is obtained finally from the image area of the determination target frame, and the area not overlapping is defined as the WB evaluation area. That is, the extraction unit 102 updates the comparison target frame as one previous frame (Step S202), as a result, determines whether or not the comparison target frame has become the (−1)-th frame, namely, has completed the detection processing of the WB evaluation areas for all the comparison target frames (Step S203). If the processing for all the frames to be compared has not completed, the extraction unit 102 refers to the determination result of the image data of the updated comparison target frame (Step S204), and recognizes whether or not the image data is one of the previous frame which has already determined as the same scene (Step S205). Here, if the image data is not the same scene, the extraction unit 12 returns to Step S202. Conversely, if the image data is the same scene, the extraction unit 12 uses the overlap area detection unit 121 in FIG. 1 to detect the areas overlapping with each other by means of the area which has been extracted as the present WB evaluation area and the image data of the comparison target frame (Step S206). It is determined whether or not the areas overlapping with each other among the areas which have been extracted as the present WB evaluation area and the image data of the comparison target frame (Step S207), and if no overlapped area exist, the extraction unit 12 returns to Step S202. Conversely, if any overlap area exists, the areas eliminating the detected overlap areas from the WB evaluation area are updated as new WB evaluation area (Step S208) ant the process is returned to Step S203.

Figure 5:
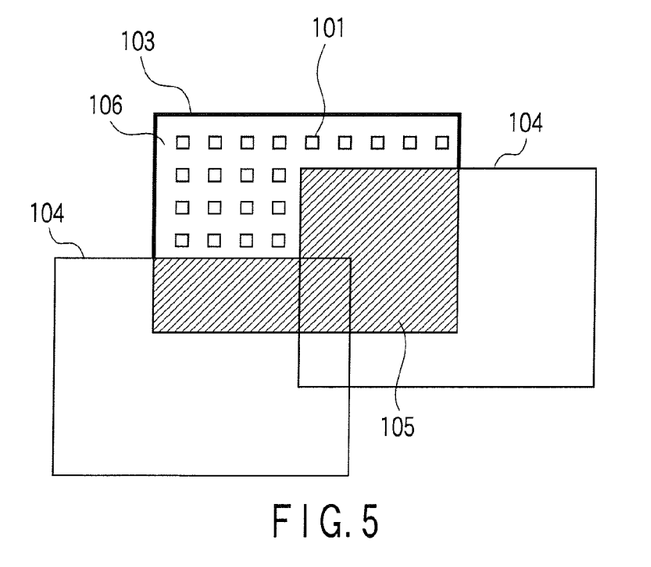
FIG. 5 is an exemplary view for explaining a WB evaluation area.

In Step S203, if it is determined that the processing has performed to all the comparison target frames, the color data of the WB evaluation area is obtained as the WB evaluation value (Step S209). That is, as shown in FIG. 5, a WB evaluation area 106 is an area on an image area 103 of a determination target frame finally detected as an area eliminated overlap areas 105 with image areas 104 of comparison target frames from the image area 103 of the determination target frame. The color signal data at each evaluation value extraction position 101, for example, each pixel position in the WB evaluation area 106 is obtained as the WB evaluation value. The averaged value of the color signal data obtained for each evaluation value extraction area 102 may be obtained as a WB evaluation value. The extraction unit 12 sets the field angle size coefficient obtained in Step S9 as a weighting coefficient and further outputs the obtained WB evaluation values together with the weighting coefficient to the WB evaluation value accumulation unit 13 to store the WB evaluation values and the weighting coefficient into the accumulation unit 13 (Step S210). Thus, the processing in Step S10 ends.

In this way, the WB evaluation value extraction unit 12 extracts the color signal in the image area not overlapping with the image data of the present frame as the WB evaluation values from the image data of the frame previous at least by one frame on the basis of the overlap area detected by using the overlap area detection unit 121.

Next, the extraction unit 12 updates the determination update flag F, which shows that the determination result relating to the determination target frames has been updated, to "1" (Step S11). The determination target frames are updated through the processing in Steps S16-S19. That is, the extraction unit 12 updates the determination target frame i to the frame which is previous by one frame (Step S16), refers to the determination result of the image data of the determination target frame (Step S17), and recognizes if the determination target frame i is the image data of the previous frame which has been determined as the same scene (Step S18). Here, if the image data is the same scene, the processing returns to Step S16. Conversely, if the image data is not the same scene, it is determined whether or not the update of the determination target frame i has already resulted in the (−1)-th frame, namely, whether or not the determination processing for all the determination target frames has ended (Step S19). If the processing for all the determination target frames has not ended, the processing returns to Step S3. In this way, repeating the processing from Step S3 to Step S15 while updating the determination target frames determines whether or not the image data is the same scene with respect to all the frames.

Thus, if it is determined that the determination processing to all the determination target frames has completed in Step S19, it is determined whether or not the determination result has been updated at least one time in Step S11 given above as the result of the processing from Step S3 to Step S19 by determining the determination update flag F showing the update of the determination result (Step S20). If the determination result has been updated at least one time, namely, if the frames that has been determined as the same scene has increased, the determination update flag F is initialized to "0" again and the determination target frame i is initialized to the (N−1)-th frame (Step S21). After this, after returning to Step S17, the processing returns to the processing in Step S3 through Steps S18 and S19, and performs again the determination processing for the frames which have not determined as the same scene. Conversely, if the frames which have determined to the same scene in Step 20 do not increase, the processing ends.

More specifically, the processing of the extraction unit 12 will be described hereinafter.

For instance, if it is assumed that the present frame is the fourth (N=3) frame, the overlap area 105 is detected in Step S4 as i=2 in Step S2, and k=3 in Step S3. Then, if it is determined that the overlap areas 105 exist in Steps S5-S7, and that the color data is the same as each other, the extraction unit 12 updates the image data of the third frame (frame previous by one frame) as the same scene. The extraction unit 12 stores the field angle size coefficient and the WB evaluation values into the WB evaluation value accumulation unit 13 in Steps S9, S10, and updates the determination update flag to "1" in Step S11.

After this, after updating, in Step S16, the determination target frame as i=1, the processing returns to Step S3 through Steps S17-S19. In the same way, in Steps S4-S11, it is determined that the image data of the second frame (frame previous by two frames) are the same scene, the field angle size coefficient and the WB evaluation values are stored in the WB evaluation value storage unit 13.

The extraction unit 12 updates the determination target frame as i=0 in Step 16, returns to Step S3 through Steps S17-S19, and it is assumed that the image data in the first frame (frame which is previous by three frames) is the same scene, the field angle size coefficient and the WB evaluation values are stored into the WB evaluation value storage unit 13. Then, in Step S16, if the determination target frame is updated to i=−1, the processing proceeds to Step S20 through Steps S17-S19. In this case, since the determination update flag is "1", the extraction unit 12 initializes the determination update flag is initialized to "0" and sets the frame as i=2 in Step S21, and proceeds to Step S17. Thus, since it is determined that the image data is the same scene in Step S18, the frame is set as i=1 in Step S18 through Step S17, and further, the frame is set as i=−1 in Step 16. Next time, since it is determined that the image data is not the same scene in Step S18, the processing proceeds to Steps S19, S20, so that the determination update flag has been initialized to "0", the processing ends.

In this way, the WB evaluation value extraction unit 12 obtains a plurality of groups of evaluation values from the image data of the present frame and the previous frames.

Next, the case in which the color signal data varies will be described.

For instance, in the case where different items of the color signal data are detected in the overlap area 105 of the first frame and the second frame, it is determined that data of the color signals is not the same as each other in Step S7 in a state of i=0, k=1 in the second frame, and k=0 is set in Step S12. Through Steps S13-S15, k=−1 is set in Step S12 again, the processing proceeds from Step S13 to Step S16. Here, i=−1 is set and the processing proceeds to Steps S17-S19, S20, and since the determination update flag is still remains as "0", the processing ends.

In the next third frame, i=1 is set in Step S2, and k=2 is set in Step S3, then, the processing proceeds to Steps S4-S7. At this time, since the third frame that is the present frame and the second frame that is the frame which is previous by one frame have the same color signal data, in Steps S8-S11, it is assumed that the image data of the second frame (frame previous one frame) is the same scene, the field angle size coefficient and the WB evaluation values are stored into the WB evaluation value accumulation unit 13.

In Step S16, the extraction unit 12 updates the determination target frame as i=0, returns to Step S3 through Steps S17-S19, and proceeds to Step S7 through Steps S4-S6. Here, since the items of the color signal data are not the same as each other in the k (=2)-th frame that is the third frame, namely the present frame and i (=0)-th frame that is the first frame, namely the frame which is previous by two frames, the processing proceeds to Step S12 to update the comparison target frame as k=1. Then, the processing proceeds to Steps S13 and S14, it is determined that the image data of the second frame if Step S15 is the same scene, and the processing proceeds to Step S4. In Step S4, in this case, since the first frame and the second frame are compared, in Step S7 through Steps S5 and S6, it is determined that the items of the color signal data are not the same as each other, and the processing proceeds to Step S12. Then the comparison target frame is updated as k=0. In this case, when the processing proceeds to Step S15 from Steps S13 and S14, since the image data is determined not to be the same scene as each other, the processing returns to Step S12, further, the comparison target frame is updated as k=−1. The processing proceeds from Step S3 to Step S16, and the determination target frame is updated as i=−1.

Then, the processing proceeds to Step S20 through Steps S17-S19, since the determination flag is "1", the determination update flag is initialized to "0" and set the frame as i=1 in Step S21, and the processing proceeds to Step S17. Since the image data is determined to be the same scene in Step S18, the processing returns to Step S16, and the frame is set as i=0. In this case, since it is also determined that the image data is the same scene in Step S18 through Step S17, the processing proceeds to Step S3 from Step S19, and the frame is set as k=2. After this, it is determined that the items of the color signal data are not the same as each other on Step S7 through Steps S4, S5 and S6, and the processing proceeds to Step S12. The comparison target frame is set as k=1, and when the processing proceeds from Steps S13 and S14 to Step S15, the image data is determined to be the same scene, and the processing proceeds to Step S4. It is determined that the items of the color signal data is not the same as each other in Step S7 through Steps S5 and S6, the processing proceeds to Step S12. Then, the frame is set as k=0, and the frame is set as k=−1 again in Step S12 from Step S13 through Steps S14, S15, and the processing proceeds to Step S16 from Step S13. Here, the frame is set as i=−1, the processing proceeds to Steps S17-S19, S20, and the determination update flag remains still "0", so that the processing ends.

In the next fourth frame, the frame is set as i=2 in Step S2, the frame is set as k=3 in Step S3, and the processing proceeds to Steps S4-S7. At this time, since the items of the color signal data are the same each other between the fourth frame that is the present frame and the third frame that is the frame which is previous by one frame, it is determined that the items of the image data of the third frame (frame previous by one frame) are the same as each other in Steps S8-S11, and the field angle size coefficient and the WB evaluation values are stored into the WB evaluation value calculation unit 13.

The extraction unit 12 then updates the frame as i=1 in Step S16, returns to Step S3 through Steps S17-S19, and proceeds to Step S7 through Steps S4-S6. Here, since the items of the color signal data in the fourth frame that is the present frame and the second frame that is the frame which is previous by two frames are the same as each other, in Steps S8-S11, the image data of the second frame (frame previous by two frames) is determined to the same scene, and the extraction unit 12 stores the field angle size coefficient and the WB evaluation values into the WB evaluation value calculation unit 13.

The extraction unit 12 updates the determination target frame as i=0 in Step S16, returns to Step S3 through Steps S17-S19, and proceeds to Step S7 through Steps S4-S6. Here, since the fourth frame that is the k (=3)-th, namely the present frame, and the first frame that is the i (=0)-th frame, namely the frame which is previous by three are different in color signal data, the processing proceeds to Step S12, to update the comparison target frame as k=2. The extraction unit 12 then proceeds to Steps S13 and S14, it is determined, in Step S15, that the image data of the third frame is the same scene, and proceeds to Step S4. In Step S4, since, in this case, the first frame and the third frame are compared with each other, the frames are determined to be different in color signal data in Step S7 through Steps S5 and S6 all the same, and the processing proceeds to Step S12. Then, the comparison target frame is updated as k=1. The extraction unit 12 proceeds to Steps S13 and S14, the image data of the second frame is determined to be the same scene in Step S15, and proceeds to Step S4. In Step S4, in this case, since the extraction unit 12 compares the first frame with the second frame, it is determined that the items of the color signal data are different from each other in Step S7 through Steps S5 and S6, the extraction unit 12 proceeds to Step S12. The comparison target frame is updated as k=0. In this case, when the processing proceeds from Steps S13 and S14 to Step S15, since the image data is not the same scene, the processing returns to Step S12 to further update the comparison target frame as k=−1. The processing proceeds from Step S3 to Step S16 to update the determination target frame as i=−1.

Then, the extraction unit 12 proceeds to Step S20 through Steps S17-S19, and since the determination update flag has been set to "1", the extraction unit 12 initializes the determination update flag to "0" in Step S21, sets frame as i=2, and proceeds to Step S17. In Step S18, since the image data is determined to be the same scene in Step S18, the processing returns to Step S16, and the frame is set as i=1. Also at this time, it is determined that the image data is the same scene in Step S18, the extraction unit 12 returns to Step S16 to set the frame as i=0. Then, it is determined that the image data is not the same scene in Step S18 through Step S17, the extraction unit 12 proceeds to Step S3 from Step S19, and updates the frame as k=3. After this, it is determined that the items of the color signal data are not the same as each other in Step S7 through Steps S4, S5, S6, and the processing proceeds to Step S12. The extraction unit 12 then sets the fame as k=2, proceeds to Steps S13, S14, it is determined that the image data of the third frame is the same scene in Step S15, and proceeds to Step S4. In Step S4, in this case, since the extraction unit 12 compares the first frame and the third frame, determines that the items of the color signal data is not the same as each other in Step S7 through Steps S5, S6, and proceeds to Step S12. When updating the comparison target frame as k=1 to proceed from Steps S13, S14 to Step S15, the extraction unit 12 determines to be the same scene, and proceeds to Step S4. The extraction unit 12 then determines that the items of the color signal data are not the same as each other in Step S7 through Steps S5, S6, to proceed to Step S12. The extraction unit 12 sets the frame as k−0, updates the frame as k=−1 in Step S12 again though Steps S14, S15 from Step S13, and proceeds to Step S16 from Step S13. Here, the frame is set to i=−1, the processing proceeds to Steps S17-S19, S20, and since the determination update flag remains as "0", the processing ends.

In this way, the WB evaluation value extraction unit 12 obtains a plurality of groups of the evaluation values from the image data of the present frame and the same scene as the present frame, namely, the previous frame acquired in the same illumination environment.

Next, the case where the overlap areas are eliminated will be described.

For instance, in the case where no overlap area 105 is detected in the first frame and the second frame, in the second frame, it is determined that no overlap area exists in Step S5 in a state of i=0, k=1, the frame is set as k=0 in Step S12. The frame becomes k=−1 in Step S12 again through Steps S13, S14 and S15, and the processing proceeds from Step S13 to Step S16. Here, the extraction unit 12 sets the frame as i=−1, proceeds to Steps S17-S19, S20, and since the determination update flag remains as "0", ends the processing.

In the next third frame, the frame is set as i=1 in Step S2, the frame is set as k=2, the processing proceeds to Step S5 through Step S4. At this time, if the overlap area 105 exists between the third frame that is the present frame and the second frame that is the frame which is previous by one frame, it is supposed that the image data of the second frame (frame previous by one frame) is recognized as the same scene in Steps S8-S11, and the field angle size coefficient and the WB evaluation values are stored into the WB evaluation value accumulation unit 13.

The extraction unit 12 then updates the determination target frame as i=0 in Step S16, returns to Step S3 through Steps S17-S19, and proceeds to Step S5 through Step S4. Here, since no overlap area 105 exists between the k (=2)-th frame that is the third frame, namely the present frame and the i (=0)-th frame that is the first frame, namely the frame previous by two frames, and the processing proceeds to Step S12 to update the comparison target frame as k=1. The extraction unit 12 then proceeds to Steps S13 and S14, determines that the image data of the second frame is the same scene in Step S15, and proceeds to Step S4. In Step S4, since the extraction unit 12 compares between the first frame and the second frame in this case, determines that no overlap area exists in Step S5, and proceeds to Step S12. Then the comparison target frame is updated as k=0. In this case, when the processing proceeds to Step S15 from Steps S13 and S14, since it is determined that the image data is not the same scene, the processing returns to Step S12 to further update the comparison target frame as k=−1. The processing proceeds to Step S16 from Step S13, and the determination target frame is updated as i=−1.

Then, the extraction unit 12 proceeds to Step S20 through Steps S17-S19, and since the determination update flag "1", initializes the determination update flag to "0" in Step S21 and also sets the frame as i=1, and proceeds to Step S17. Since it is determined that the image data is the same scene in Step S18, the extraction unit 12 returns to Step S16 to set the frame as i=0. In this case, since it is determined that the image data is not the same scene in Step S18 through Step S17, the processing proceeds to Step S3 from Step S19 to set the frame as k=2. After this, it is determined that no overlap area exists in Step S5 through Step S4, the processing is proceeded to Step S12. The frame is set as k=1, the processing proceeds to Step S15 from Steps S13 and S14, since it is determined that the image data is the same scene, the processing proceeds to Step S4. Then, it is determined that no overlap area exists in Step S5, the processing is proceeded to Step S12. The frame is set as k=0, the processing proceeds to Step S12 again through Steps S14 and S15 from Step S13, the frame is set as k=−1, and the processing proceeds to Step S16 from Step S13. Here, the frame is set as i=−1, the processing proceeds to Steps S17-S19, S20, and since the determination update flag remains still "0", the processing ends.

In the fourth frame, in Step S2, i=2 is set, in Step S3, k=3 is set, the processing proceeds to Steps S4 and S5. At this time, since the overlap area exists between the fourth frame that is the present frame and the third frame that is the frame which is previous by one frame, the image data of the third frame (frame previous by one frame) is recognized as the same scene in Steps S6-S11, the image angel size coefficient and the WB evaluation values are stored into the WB evaluation value accumulation unit 13.

The extraction unit 12 updates the determination target frame as i=1 in Step S16, returns to Step S3 through Steps S17-S19, and proceeds to Step S5 through Step S4. Here, since the overlap area exists between the fourth frame that is the present frame and the second frame that is the frame which is previous by two frames, the extraction unit 12 recognizes that the image data of the second frame (frame previous by two frames) is the same scene in Steps S6-S11, and stores the field angle size coefficient and the WB evaluation values into the WB evaluation value accumulation unit 13.

The extraction unit 12 updates the determination target frame as i=0 in Step S16, returns to Step S3 through Steps S17-S19, and proceeds to Step S5 through Step S4. Here, since no overlap area exists between the k (=3)-th frame that is fourth-frame, namely the present frame and the i (=0)-th frame that is the first frame, namely the frame which is previous by three frames, the extraction unit 12 proceeds to Step S12 to update the comparison target frame as k=2. The extraction unit 12 then proceeds to Steps S13 and S14, determines that the image data of the third frame is the same scene in Step S15, and results in proceeding to Step S4. In this case, in Step S4, since the extraction unit 12 compares the first frame with the third frame, determines that no overlap area exists in Step S5, and proceeds to Step S12. The comparison target frame is updated as k=1, the processing is proceeded to Steps S13 and 14, it is determined, in Step S15, that the image data of the second frame is the same scene, the processing is proceeded to Step S4. In this case, in Step S4, since the first frame and the second frame are compared with each other, it is determined that no overlap area exists in Step S5, and thus, the processing is proceeded to Step S12. The extraction unit 12 then updates the comparison target frame as k=0. In this case, when the processing proceeds to Step S15 from Steps S13 and S14, since the image data is not the same scene, the processing returns to Step S12, and further, updates the comparison target frame as k=−1. The processing proceeds to Step S16 from Step S13, then, the determination target frame is updated as i=−1.

Then, the extraction unit 12 proceeds to Step S20 through Steps S17-S19, since the determination update flag has been set to "1", initializes the determination update flag to "0" and also sets the frame as i=2 in Step S21, and proceeds to Step S17. Since it is determined that the image data is the same scene in Step S18, the extraction unit 12 returns to Step S16 to set the frame as i=1. In this case, since it is determined that the image data is the same scene in Step S18, the extraction unit 12 returns to Step S16 to further set the frame as i=0. Then, it is determined that the image data is not the same scene in Step S18 through Step S17, so that the extraction unit 12 proceeds to Step S3 from Step S19 to set the frame as k=3. After this, it is determined that no overlap area exists in Step S5 through Step S4, and the processing is proceeded to Step S12. The extraction unit 12 then sets the frame as k=2, and proceeds to Steps S13 and S14, it is determined that the image data of the third frame is the same scene in Step S15, and proceeds to Step S4. In Step S4, in this case, since the first frame and the third frame are compared with each other, it is determined that no overlap area exist in Step S5, the processing proceeds to Step S12. The extraction unit 12 updates the comparison target frame as k=1, and when proceeds to Step S15 from Steps S13 and S14, determines that the image data is the same scene, and proceeds to Step S4. In Step S5, it is determined that no overlap area exists, and the processing proceeds to Step S12. The frame is set as k=0, the processing proceeds to Step S12 again from Step S13 through Steps S14, and S15, the frame is set as k=−1, and the processing proceeds to Step S16 from Step S13. Here, the extraction unit 12 sets the frame as i=−1, proceeds to Steps S17-S19, S20, and since the determination update flag remains as "0", ends the processing.

In this way, the WB evaluation value extraction unit 12 obtains a plurality of groups of evaluation values from the areas not overlapping between the image data of the present frame and the image data of the previous frames.

As described above, the WB evaluation value extraction unit 12 functions as an evaluation value acquisition unit which acquires the plurality of groups of evaluation values from the image data of the present and the previous frames. The evaluation values acquired from the image data of the previous frame that is the determination target frame are selectively acquired so as to be acquired solely the WB evaluation area 106 that is non-overlap area of the frame that is determined as the same scene.

As mentioned above, when the processing of the WB evaluation value extraction unit 12 of FIG. 1 ends the processing, the WB coefficient calculation unit 14 performs calculation processing of the WB coefficient by using the WB evaluation values accumulated in the WB evaluation value accumulation unit 13.

Figure 6:
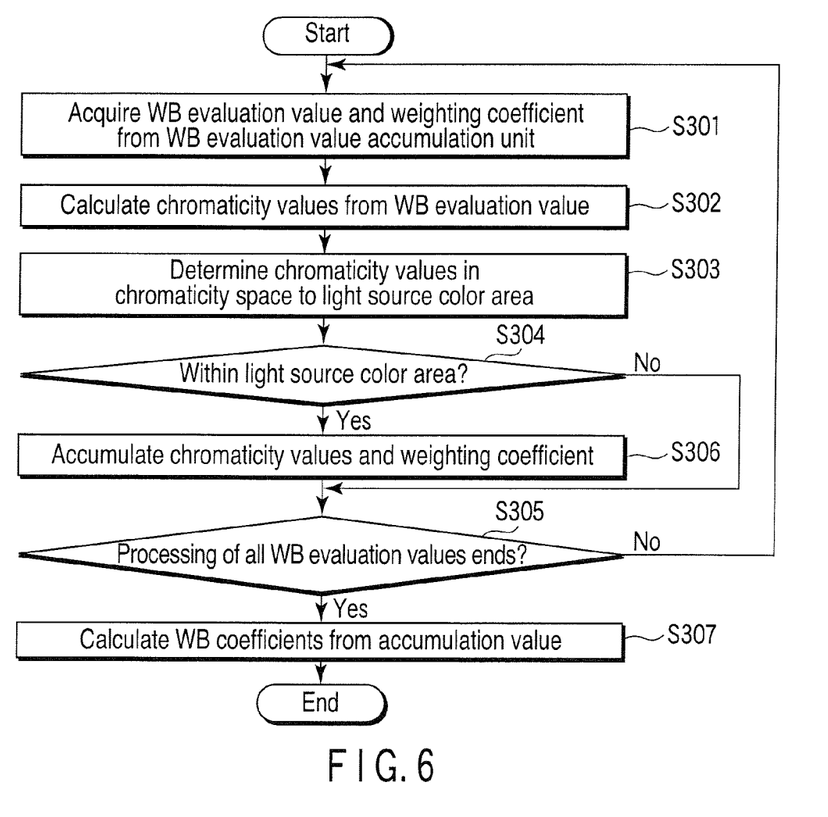
FIG. 6 is an exemplary view depicting a flowchart for explaining a process in WB coefficient calculation of a WB coefficient calculation unit of FIG. 1.
Figure 7:
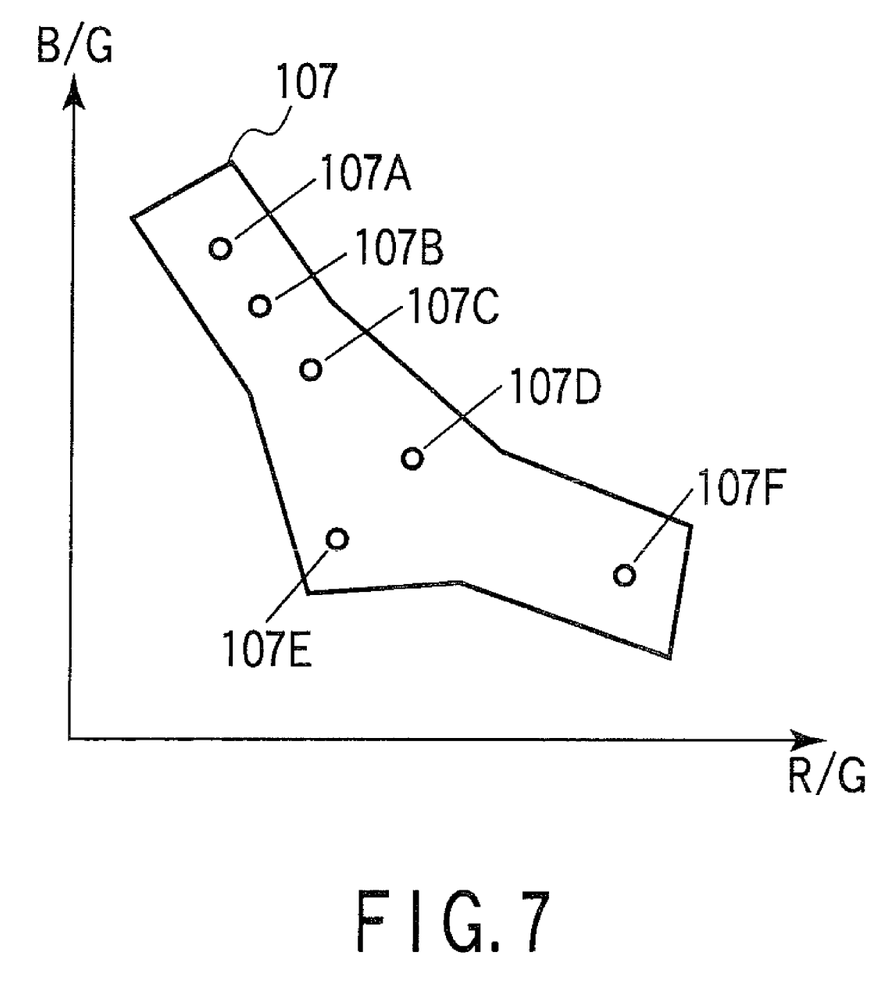
FIG. 7 is an exemplary view for explaining a light source color area defined in a chromaticity space.

The process of the WB coefficient calculation processing in the WB coefficient value calculation unit 14 will be described with reference to FIG. 6. The calculation unit 14 firstly acquires one WB evaluation value and one weighting coefficient corresponding to the evaluation value, from the WB evaluation values and the weighting coefficients accumulated in the accumulation unit 13 (Step S301), and calculates chromaticity values (R/G, B/G) on the basis of the color signal data that is the acquired WB evaluation value (Step S302). The calculation unit 14 determines whether or not the calculated chromaticity values are included in a light source color area 107 defined in a chromaticity space shown in FIG. 7 (Step S303). In FIG. 7, a reference number 107A indicates presser chromaticity values in shaded area, a reference number 107B indicates preset chromaticity values in a cloudy day, a reference number 107C indicates preset chromaticity values in a fine day, a reference number 107D indicates preset chromaticity values in an early-evening, a reference number 107E indicates preset chromaticity values in a fluorescent light, and a reference number 107F indicates preset chromaticity values in a light bulb, respectively. Here, if the chromaticity values are not included in the light source color area 107 (Step S304), it is determined whether or not the aforementioned processing has ended in all the WB evaluation values (Step S305). If any WB evaluation value which has not been processed exists in the accumulation unit 13, the calculation unit 14 returns to Step S301 to acquire the next WB evaluation value and weighting coefficient.

Conversely, in the case where the calculated chromaticity values are included in the light source color area 107, the calculation unit 14 calculates the color chromaticity values and the weighting coefficient to each accumulation value (Step S306). The calculation unit 14 then proceeds to Step S305 to determine whether or not all the WB evaluation values have completed the above processing. If the WB evaluation value of which the processing has not completed yet exists in the WB evaluation value accumulation unit 13, the calculation unit 14 returns to Step S301.

In Step S305, if it is determined that all the WB evaluation values have completed the above processing, the calculation unit 14 calculates WB coefficients $W_r$ and $W_b$ from the accumulated values of the chromaticity values and the weighting coefficient (Step S307) to ends the processing. Here, if the accumulated values of the chromaticity values and the weighting coefficient which have determined to be within the light source color area 107 are set to $(R/G)_{sum}$, $(B/G)_{sum}$, $K_{sum}$, respectively, the WB coefficient $W_r$ and $W_b$ are obtained as the following Equation (2):

$$W_r = \frac{K_{sum}}{(R/G)_{sum}} \qquad (2)$$

$$W_b = \frac{K_{sum}}{(B/G)_{sum}}$$

As described above, the WB coefficient calculation unit 14 calculates white balance coefficients by weighting for each WB evaluation value on the basis of the weighting coefficient by using a field angle size coefficient that is a size rate of a relative field angle as a weighting coefficient.

According to the above description, when the WB coefficient calculation unit 14 of FIG. 1 completes its processing, the WB coefficient multiplication unit 15 multiplies image data of the present frame by the WB coefficients calculated though the WB coefficient calculation unit 14 to perform the white balance correction.

According to the embodiment described above, the image data of the previous frame(s) determined that the illustration environment is the same one on the basis of the color signal data in the overlap area 105 is used. Thereby, in a scene with less light source color, even if illumination environments are different among a plurality of frames due to a temporal change in illumination environment, the white balance correction may be performed with precision.

Since the WB evaluation values to be used in the WB coefficient calculation are obtained from the image data in the WB evaluation area 106 from which the overlap areas 105 are eliminated, if the light source color exists in areas overlapping with one another among a plurality of frames, the accurate WB coefficients can obtain without correction of an illumination light which is one-sided due to excessive evaluation of the light source color. Thus, the white balance correction can be performed with precision.

While the present invention has been described on the basis of one embodiment, the invention is not limited to the above described one embodiment, and of course, this invention may be modified and applied in various forms without departing from the spirit of scope of the general inventive concept thereof.

For instance, supplying programs of software realizing functions of the WB evaluation value extraction unit 12 and the WB coefficient calculation unit 14 to a computer, and executing the programs by the computer enables actualizing the above functions.

While the one embodiment described above has calculated the WB coefficients by using solely the evaluation values of the light source color for the WB coefficient calculation, the present invention is not limited to this embodiment. For instance, by detecting an object color which appears frequently to some extent and can specify a range of a color, such as a color of a leave in green, from the evaluation values, the light source color may be predicted from the object color.

Also in this case, using the images of the previous frames of which the illumination environments are the same as one another enables performing the white balance correction which is excellent in precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A white balance adjustment apparatus which is input image data acquired by an imager element to adjust a balance among color signals of the image data of a present frame, comprising:
   an image data storage unit configured to store image data of at least one previous frame which is acquired before the present frame;
   an evaluation value acquisition unit configured to acquire a plurality of groups of color signal data at each pixel position, as evaluation values, from the image data of the present frame and from the image data of the at least one previous frame;
   a white balance coefficient calculation unit configured to calculate white balance coefficients on the basis of the plurality of groups of evaluation values acquired by the evaluation value acquisition unit; and
   a white balance correction unit configured to correct the image data of the present frame acquired by the imager element on the basis of the white balance coefficients calculated by the white balance coefficient calculation unit, wherein
   the evaluation value acquisition unit
      includes an overlap area detection unit configured to detect image areas overlapping with each other between the image data of the at least one previous frame and the image data of the present frame, and
      selectively acquires the evaluation values to be acquired from the image data of the at least one previous frame, in response to a detection result from the overlap area detection unit.

2. The white balance adjustment apparatus according to claim 1, wherein the evaluation value acquisition unit
   further includes an environment determination unit configured to compare color signal data in the image areas overlapping with each other between the image data of the at least one previous frame and the image data of the present frame, and to determine whether or not image data of each frame is acquired in the same illumination environment, and
   extracts the evaluation values by selecting whether or not a evaluation value of each image data of the at least one previous frame should be used, in response to a determination result by the environment determination unit.

3. The white balance adjustment apparatus according to claim 2, wherein the evaluation value acquisition unit extracts color signal data in image areas not overlapping with the image data of the present frame from the image data of the at least one previous frame, as evaluation values, on the basis of overlapped areas detected by the overlap area detection unit.

4. The white balance adjustment apparatus according to claim 3, further comprising:
   a rate calculation unit configured to calculate a size rate of a relative field angle to the image data of the present frame of each image data of the at least one previous frame, wherein
   the white balance coefficient calculation unit calculates the white balance coefficients by weighting for each evaluation value, on the basis of the size rate of the relative field angle calculated by the rate calculation unit.

5. The white balance adjustment apparatus according to claim 2, further comprising:
   a rate calculation unit configured to calculate a size rate of a relative field angle to the image data of the present frame of each image data of the at least one previous frame, wherein
   the white balance coefficient calculation unit calculates the white balance coefficients by weighting for each evaluation value, on the basis of the size rate of the relative field angle calculated by the rate calculation unit.

6. The white balance adjustment apparatus according to claim 1, wherein the evaluation value acquisition unit extracts color signal data in an image area not overlapping with the image data of the present frame from the image data of the at least one previous frame, as evaluation values, on the basis of overlapped areas detected by the overlap area detection unit.

7. The white balance adjustment apparatus according to claim 6, further comprising:
   a rate calculation unit configured to calculate a size rate of a relative field angle to the image data of the present frame of each image data of the at least one previous frame, wherein
   the white balance coefficient calculation unit calculates the white balance coefficients by weighting for each evaluation value, on the basis of the size rate of the relative field angle calculated by the rate calculation unit.

8. The white balance adjustment apparatus according to claim 1, further comprising:
   a rate calculation unit configured to calculate a size rate of a relative field angle to the image data of the present frame of each image data of the at least one previous frame, wherein
   the white balance coefficient calculation unit calculates the white balance coefficients by weighting for each evaluation value, on the basis of the size rate of the relative field angle calculated by the rate calculation unit.

9. A white balance coefficient calculation method for calculating white balance coefficients for adjusting a balance among color signals of image data of a present frame acquired from an imager element, comprising:
   acquiring a plurality of groups of color signal data at each pixel position, as evaluation values from image data of a present frame acquired by the imager element and from image data of at least one previous frame which is acquired before the present frame; and
   calculating the white balance coefficients on the basis of the acquired plurality of groups of evaluation values, wherein
   the acquiring the plurality of groups of evaluation values
      includes detecting image areas overlapping with each other between the image data of the at least one previous frame and the image data of the present frame, and
      selectively acquires the evaluation values to be acquired from the image data of the at least one previous frame, in response to a detection result of the image areas overlapping with each other.

* * * * *